United States Patent [19]
Voelskow et al.

[11] 4,242,197
[45] Dec. 30, 1980

[54] METHOD OF AND APPARATUS FOR CLASSIFYING REFUSE

[75] Inventors: Peter Voelskow, Bad Kreuznach; Horst Rothert, Berlin; Gustav Schlotterer, Düsseldorf, all of Fed. Rep. of Germany

[73] Assignee: Fritz-Aurel Goergen, Cologny, Switzerland

[21] Appl. No.: 661,028

[22] Filed: Feb. 24, 1976

[30] Foreign Application Priority Data

Feb. 27, 1975 [CH] Switzerland ............ 2471/75
Oct. 8, 1975 [DE] Fed. Rep. of Germany ....... 2544964

[51] Int. Cl.³ .............................................. B07B 15/00
[52] U.S. Cl. ............................................ 209/3; 209/12; 209/38; 209/39; 209/135; 209/145; 209/153
[58] Field of Search ............... 209/3, 12, 38, 39, 115, 209/120, 10, 134–137, 142–145, 307, 308, 45; 241/20

[56] References Cited

U.S. PATENT DOCUMENTS

| | | | |
|---|---|---|---|
| 425,341 | 4/1890 | Piette | 209/142 |
| 974,395 | 11/1910 | Kidder | 209/120 |
| 2,710,097 | 6/1955 | Bolles | 209/12 |
| 2,941,667 | 6/1960 | Hilgartner et al. | 209/134 |
| 3,107,475 | 10/1963 | Gustafson | 209/12 X |
| 3,667,600 | 6/1972 | Oi et al. | 209/144 |
| 3,720,307 | 3/1973 | Hukki | 209/135 X |
| 3,756,401 | 9/1973 | Rosner | 209/39 |
| 3,802,631 | 4/1974 | Boyd | 241/20 |
| 3,909,397 | 9/1975 | Aldinger | 209/307 |

FOREIGN PATENT DOCUMENTS

1178022 9/1964 Fed. Rep. of Germany .

Primary Examiner—Ralph J. Hill
Attorney, Agent, or Firm—Michael J. Striker

[57] ABSTRACT

Raw and uncomminuted refuse is introduced through an entrance port into a substantially closed chamber as a horizontally flowing stream so that the refuse drops in the chamber along a path. A current of air is circulated in a closed circuit through the chamber and is directed in the chamber generally perpendicular to the path of the falling refuse and is inspired in the chamber through a sieve oriented substantially perpendicular to the current in the chamber. A minor portion of the air is withdrawn from the circuit, filtered, and released to the atmosphere. This withdrawn portion is replaced in the circuit by drawing air into the chamber substantially only through the entrance port so that slight subatmosphere pressure is created in the chamber to prevent the generation of unwanted dust or smell.

13 Claims, 6 Drawing Figures

METHOD OF AND APPARATUS FOR CLASSIFYING REFUSE

BACKGROUND OF THE INVENTION

The present invention relates to a method of and apparatus for treating refuse. More particularly this invention concerns a system for classifying refuse into several fractions.

For years refuse was usually burned or simply dumped outside. The incineration process not only requires the use of expensive equipment whose servicing and running is extremely expensive, but also usually due to the inadequate burning of the refuse creates an enormous amount of offensive solid ash and gases. The noxious vapors produced by incineration lead to rapid destruction of the equipment so that the process is quite expensive.

In order to achieve a better combustibility it has been suggested to coarsely comminute the refuse or trash before incinerating it. This makes it burn better and, when coupled with a subsequent drying operation, reduces the ash output considerably. It is also known to air-classify the refuse which has been coarsely comminuted by means of a hammer mill so as to separate from it stone, metal and glass particles before the burning operation. Thus all that is left to burn is the paper, wood and synthetic resin in the refuse. Not only does this considerably reduce the ash, but the heat produced by such combustion can often by exploited. With such a system, however, the treatment of the refuse prior to incineration nonetheless remains very expensive as the heat necessary to dry it and the energy necessary to operate the hammer mill represent a considerable operating cost.

It has been suggested to coarsely comminute the refuse by means of a hammer mill and then roughly classify it into a heavy fraction and a light fraction. The heavy fraction is then passed through a magnetic separator and the non-magnetic portion left is again air classified. The light fraction from the second classification and the originally obtained light fraction are then fed to another hammer mill and again classified so that the heavy organic particles and pieces in the refuse as well as the aluminum therein can be separated from the paper and synthetic-resin items in the trash. In such a system the trash or refuse is not dried so that a considerable saving in energy is obtained. Nonetheless the several milling operations as well as the several air-classifying operations do represent a considerable amount of equipment and, therefore, operating cost.

A further suggestion has been to first shake the refuse on a sieve so as to separate from the refuse ashes, sand and small particulate organic material. The remaining coarse refuse is then fed to a slicing-roller comminuter which cuts the refuse up into uniformly sized pieces whose maximum dimensions are between four and eight inches. The so-comminuted refuse is then air classified in a closed wind tunnel where the heavy synthetic-resin fraction is floated off and the ferromagnetic parts are drawn out by a large magnetic band, leaving only glass behind. Such a method has the advantage that it sorts the refuse into several distinct and readily recyclable fractions. Nonetheless the first comminution process is at least partially counter productive as it reduces many of the recyclable elements into smaller pieces that merely make the recycling operation more difficult. In any case this first coarse comminution step is nonetheless used in order to make the air classification as effective as possible. Even so a very strong wind current must be used to separate the various fractions. Thus it is necessary that this method be carried out in a closed chamber as the generation of dust and the like would surely be a pollution problem.

Another suggestion, seen in German patent 1,178,022, uses the method of placing the refuse on a rapidly moving horizontal transport band. This band is further reciprocated back and forth in a direction perpendicular to its carrying surface. This presorts the refuse. At its downstream end the refuse is thrown off with considerable force so that the particles with less weight quickly lose their energy and therefore fall close underneath the downstream end of the belt. However, the heavier particles have considerable inertia so that they are thrown relatively far from the sorting belt. Such classifying is helped by passing a current of air downwardly across the path of the refuse thrown from the belt.

Use of such a horizontal classifying band which is also vertically reciprocated nonetheless does not give altogether satisfactory results in that the trash is not surely separated into distinct classifications as the length of the trajectories followed by the items of trash varies as the belt reciprocates vertically. This gives the normally flat transport band the same disadvantage of a tossing roller in a classifying system, that is the items of trash should all have at least at the start the same trajectory so that a uniform classification is insured.

SUMMARY OF THE INVENTION

It is therefore an object of the present invention to provide an improved method of and apparatus for treating refuse.

Another object is the provision of an improved refuse-classifying system which overcomes the above-given disadvantages.

Yet another object is to provide a refuse-classifying system which surely and accurately separates the refuse into several distinct fractions using a minimal amount of energy.

These objects are attained according to the present invention in a method wherein the refuse in a raw and uncomminuted condition is introduced as a stream at a predetermined velocity in a predetermined direction into a substantially closed chamber so that the refuse stream drops in this chamber along a path. A current of air is circulated in a closed circuit through the chamber and is directed in the chamber generally perpendicularly to the path of the falling refuse and is inspired in the chamber through a sieve that is oriented substantially perpendicularly to the current in the chamber. In this manner the heavy fraction will fall along a parabolic path generally undisturbed by the current of air in an arrangement wherein the stream is introduced horizontally. The medium heavy fraction will be deflected somewhat by the current of air and fall at a distance from the heavy fraction. The light fraction will be completely caught up by the current of air and captured on the sieve. Finally the fine particulate fraction will be caught up completely in the current of air and drawn out of the chamber.

In accordance with another feature of this invention the stream is introduced into the chamber through an entrance port. A minor portion of the air in the closed circuit is withdrawn from the closed circuit, filtered and released to the atmosphere so as to create an underpressure in the chamber. Thus the withdrawn portion of air is automatically replaced by drawing air into the chamber substantially only through the entrance port. In this manner the invariably dusty and often bad-smelling air in the classifying chamber does not escape to the exterior and the provision of complicated gas-lock arrangements is eliminated.

With the present invention it is possible to work with almost completely untreated refuse. The only steps which might be employed are a generally loosening-up operation to separate clumped-up or compacted refuse, and a tearing operation to rip open bags containing refuse. Otherwise the refuse in its raw and uncomminuted state can be fed directly to the classifying device so that the bottles, for instance, need not be broken and large pieces of recyclable material can be recovered.

The treatment apparatus according to the present invention comprises a chamber that is closed except for an entrance port and a conduit forming a closed circuit including the chamber. A blower is provided in the conduit and an endless continuously driven conveyor belt enters the chamber through the entrance port and serves to introduce the refuse into the chamber in a horizontal direction. The one end of the conduit terminates in the chamber at a location so as to direct a current air perpendicularly at the path of the falling refuse and a sieve is provided on the other side of the chamber arranged perpendicular to this current of air. According to this invention the sieve may be provided with a continuously displaced foraminous surface to prevent blockage. The belt is arranged so that its upper refuse-supporting reach at least is almost perfectly horizontal and the downstream end of this upper reach in the chamber does not move so that the refuse is all introduced at the same speed in the same direction. This insures a precise classification of the refuse. It is noted that simply discharging the refuse into the chamber in a horizontal direction will affect a classification almost purely by density as the denser refuse items—stones, pieces of metal, lumps of heavy organic material—will follow the longest and flattest trajectories and the less dense items—light synthetic-resin bodies, pieces of paper—will quickly lose their kinetic energy due to air drag and drop close to the end of the belt. Provision of a cross-air current, especially when it is directed horizontally in a direction opposite the direction of introduction of the stream of refuse, enhances the classification by increasing the effect of air drag on the items of refuse, thereby classifying them principally by means of surface density. Those items with the greatest surface density offer, therefore, the least drag and those items with greater surface density will be pushed back counter to their introduction direction by the air current. Thus it is possible in a relatively small space to obtain a wide fractionation.

According to another feature of this invention the sieve in the chamber is comprised, as described above, of a continuously displaced foraminous sheet passing in front of the suction side of the air-circulation conduit. This sheet can be mounted on a drum and a cleaning brush provided at one side to strip off it light items that adhere to it. It is also possible to provide this sheet as a continuously moving vertically extending belt whose reach toward the falling refuse moves downwardly. The air is only inspired through the central portion of the belt so that material adhering to this belt can readily be stripped off it at the bottom turn-around location.

The bottom of the classifying chamber is provided with several upwardly open troughs each adapted to catch a respective fraction of the refuse. At least the trough adapted to catch the lightest fraction is provided at its base with a comminuter so that the pieces of textile, paper and the like in this trough may be chopped up and expelled from the trough through a gas lock. If the current of air is passed across the path of the falling refuse in a horizontal direction transverse to the introduction direction the troughs are arranged diagonally relative to these two directions, but when the air-current direction is directly opposite the refuse-introduction direction the troughs are perpendicular to these directions. The advantage of this system is that the easily comminuted light fraction can be reduced at relatively low cost to a usable and burnable product. The heavier fraction typically is much harder to comminute and, indeed, it is usually not necessary to comminute it.

It is possible in accordance with this invention to provide a cyclone in the recirculation conduit for separating out sand, ashes and the like. These items will not be caught in any of the troughs but will be aspirated at the suction end of the circulation conduit since they will simply become airborne on the circulating current of air. It is desirable to separate this relatively unburnable fraction from the normally easily burnable light fraction.

In accordance with another feature of this invention the entrance port is at the upper portion of the chamber and the refuse is moved up to this chamber on a conveyor belt formed of an open work metal chain arrangement. Thus a fine fraction of dust and sand and the like can be separated out even before introduction into the chamber so as to unburden the apparatus. It is possible to form the openings in this belt so large that very compact and heavy items such as small bottles, stones and the like can fall through it whereas voluminous and fibrous items such as paper, cardboard, textile pieces and plastic bags are held up on the belt. It is also possible in accordance with this invention to shake the refuse on this belt. This may be done by passing a horizontally extending reach of the belt over a pair of vertically reciprocal elements so that any small dense bodies will bounce around and fall through the holes in the belt. Similarly such an arrangement helps to loosen up the trash. In such an arrangement it is advantageous to provide a soft receiving surface for the items that fall through the belt so that bottles, for instance will not be broken. This is easily effected by allowing the refuse to fall through onto a soft and loosely spanned upper reach of a further endless transport belt. Such an arrangement is particularly useful in that it keeps glass bottles unbroken and makes their handling for recycling a much safer and easier operation.

In accordance with another feature of this invention the above-described foraminous feeder belt is juxtaposed with devices for ripping open garbage bags and loosening up compacted trash. This is embodied in the invention by providing spaced above the feeder belt continuously rotating drums carrying radially extending spikes that move at their point of closest approach to the feeder belt in a direction opposite this belt and which approach the feeder belt at the closest by a distance of between 200 mm and 500 mm. Thus large bulky items such as bagged trash will be engaged by these spikes and pushed backwards so that they are ripped open. This feeder belt can have an upper reach divided into a first rising section over which are provided the above-described spiked rollers and under which is provided a catch plate that prevents items from falling through the rising portion and a horizontal upper or downstream portion which passes over the above-described soft bottle-catching belt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
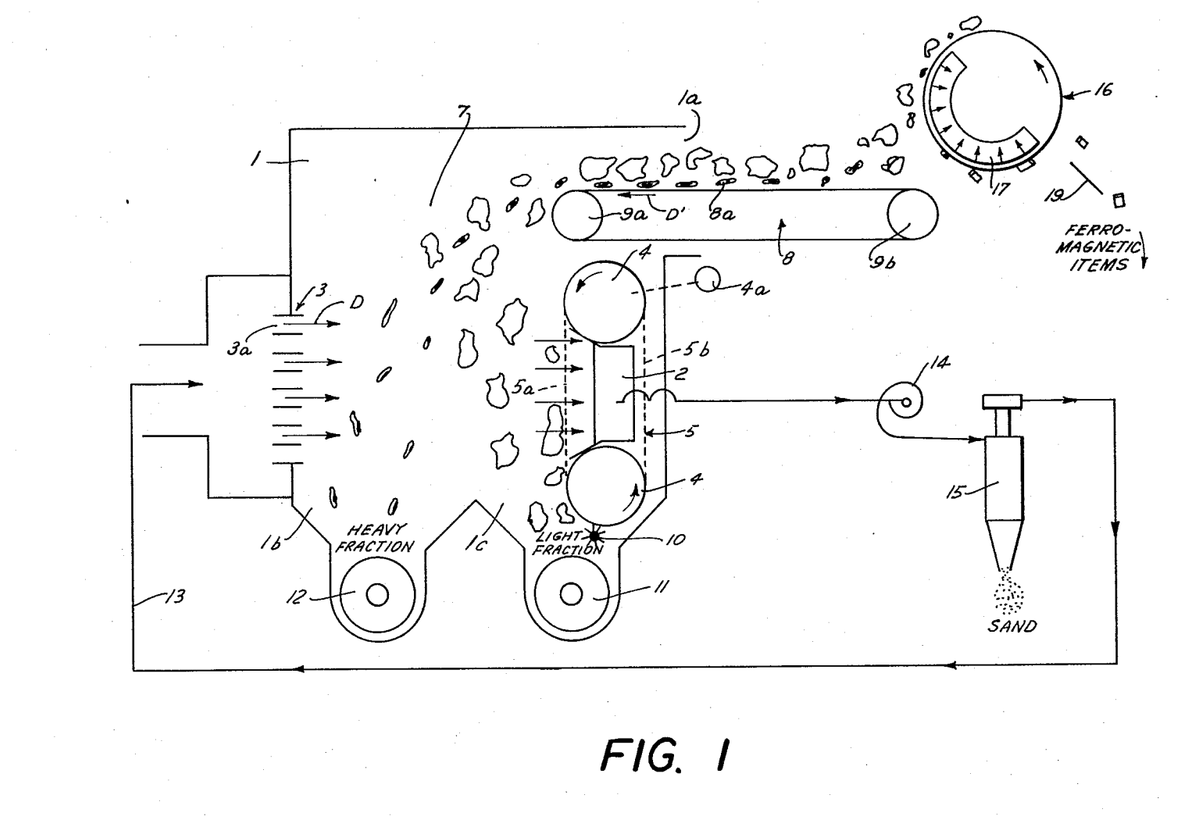
FIG. 1 is a side elevational view partly in schematic form illustrating a system according to the present invention.

The arrangement shown in FIG. 1 has a generally closed classifying room 1 provided at one side of its upper wall with an inlet port 1a and having a bottom wall formed of two parallel troughs 1b and 1c. An air-circulating conduit 13 has a downstream end opening at 2 between horizontally spaced vertically extending reaches 5a and 5b of a foraminous belt 5 spanned between a pair of horizontally extending and vertically spaced rollers 4, one of which is continuously rotated by means of a drive motor 4a. The other end of this conduit 13 opens at 3 into the chamber through a plurality of short horizontally extending tubes 3a defining an air-current direction D. Refuse shown at 6 is introduced into the chamber 1 by means of a horizontally extending belt 8 spanned over a pair of parallel horizontal rollers 9a and 9b and having an upper stretch 8a moving in a direction D' directly opposite the direction D.

Underneath the lower solid drive roller 4 for the belt 5 there is provided a stripping brush 10. At the bottom of the trough 1c there is provided a horizontally extending auger 11 and a similar such auger 12 is provided in the bottom of the trough 1b, these two troughs 1b and 1c extending perpendicular to the directions D and D'.

A blower 14 is provided in the conduit 13 to draw in air at 2 and expel it at 3. In addition a cyclone 15 is provided in the conduit 13 downstream of the blower 14 in order to separate out fine particulate material from the air stream in this schematically illustrated conduit 13.

Before being placed onto the upper stretch 8a of the belt 8 the refuse 6 is passed over a continuously rotating non-magnetic drum 16 inside of which is provided a permanent magnet 17. In this manner ferromagnetic portions 18 of the trash 6 will be adhered to the drum 16 in the region of the magnet 17 and pulled out of the refuse so as to drop off over a deflecting plate 19.

After the ferromagnetic fraction has been separated out of the refuse 6 it is introduced into the interior 7 of the chamber 1 through the port 1a. In this chamber 1 the fraction of greater surface density will have the greatest inertia and follow a trajectory that is long and flat so that these items, shown dark in FIG. 1, will fall into the trough 1b. The lighter fraction will be pushed back by the air flowing in the direction D generally perpendicular to the direction of fall of the refuse 6 and will either drop into the trough 1c or come to rest against the upstream reach 5a of the belt 5. Material adhering to this belt 5 is scraped off at 10 and drops into the trough 1c where it may be displaced out by means of the auger 11 through a gas lock (not shown). Fine particulate materials such as dust, ashes, sand and the like will be inspired at 2 and pulled through the blower 14. The cyclone 15 will strip out this fine particulate material so that it will not be reintroduced into the interior 7 of the chamber 1.

Figures 2, 3:
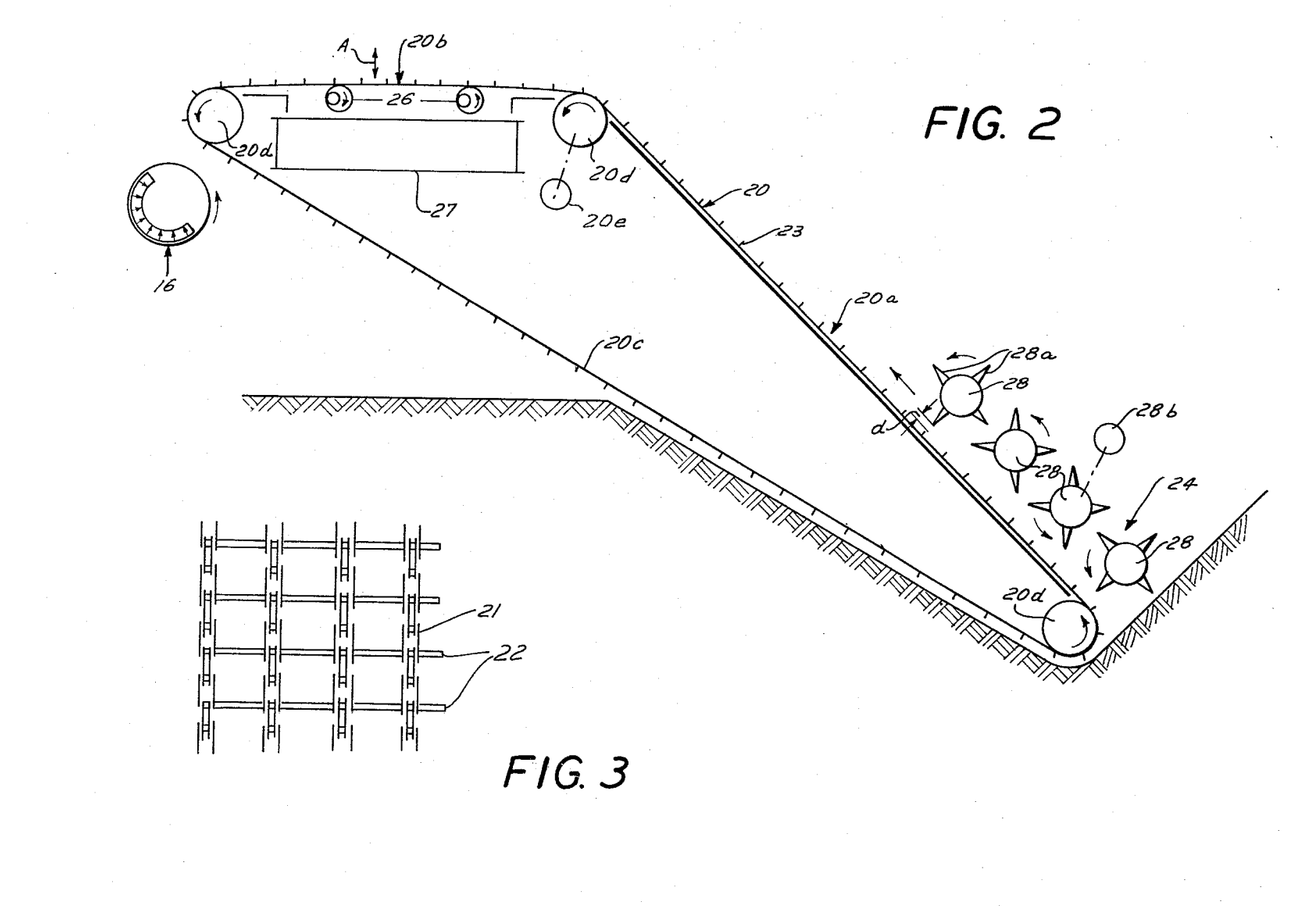
FIG. 2 is a side view illustrating a feeder conveyor for the system of FIG. 1.
FIG. 3 is a large-scale detail view of part of the feeder belt of FIG. 2.

FIG. 2 shows a feeder belt 20 that takes the refuse and drops it onto the magnetic separator 16. This belt 20 comprises a plurality of parallel bicycle-type chains 21 interconnected via rods 22 to form a continuous feeder belt. Small pins 23 extend upwardly from the belt 20. This belt 20 is divided into three portions, a rising feeder portion 20a, a horizontal portion 20b, and a return portion 20c. Drive rollers 20d at least one of which is driven by means of a motor 20e define these sections 20a-c. Refuse is dropped onto the lower end of the rising stretch 20a at 24. In this region there are provided four spike rollers 28 having spikes 28a and driven by motors 28b so that the spikes move in their location closer to the stretch 20a in a direction opposite the rising displacement direction of the belt. The distance d between the points of the spikes 28a at their closest approach to the belt section 20a is equal to between 200 mm and 500 mm. Thus garbage bags, cardboard boxes, and the like will be ripped open by these spikes 28a without comminution of the refuse so that it can be classified. The horizontal stretch 20b from whose downstream end the refuse is dropped onto the separator 16 passes over two eccentric discs 26 continuously rotated in opposite directions so as to bounce this section up and down as indicated by the double-headed arrow A. Provided underneath this stretch 20b is a horizontally extending endless soft transport belt 27 which runs in a direction perpendicular to the displacement direction of the stretch 20b. Thus small items such as bottles and the like which can pass through the holes defined between the chains 21 and rods 22 will fall onto this belt 27 and be conducted laterally out of the system. This type of arrangement is particularly advantageous in that bottles and the like will not be broken when they are sorted out at this stage so that their subsequent handling for recycling is made substantially less dangerous.

In the arrangement as shown in FIGS. 4A, 4B, 5 and 6, reference numerals employed in FIGS. 1-3 are used for functionally identical structure.

In this arrangement the classifying chamber 1' has an entrance port 45 up through which extends a feed belt 42 terminating above the throwing belt 9. In this arrangement air is aspirated through the axial input of a squirrel-cage blower 14', and fed via a conduit 13' to the axial input of another blower 33 whose radial output feeds through a vertical conduit 34 to an outlet 44 formed of a plurality of holes 43 in a cylindrically arcuate corner portion of the housing 1' directly in line with the conveyor belt 9.

In this arrangement the band-type filter 5 of FIG. 1 is replaced by a drum filter 29 having a cleaning brush 10' operated by a motor 10a'.

In the bottom of the housing 1' there are provided four troughs 30, 31a, 31b and 31c. The trough 30 is located in back of and downstream of the drum filter 29 and acts cyclone-fashion to catch fine particulate material carried through the filter 29. The trough 31a is provided at its bottom with a comminuter 32 and serves to catch the lightest fraction of refuse. The medium heavy fraction is caught in second trough 31b and the heaviest fraction in trough 31c.

Extending laterally from the return conduit 13' is a pipe 35 whose flow cross-section is a fraction of that of the conduit 13'. A cyclone 15 identical to the cyclone of FIG. 1 is connected to this pipe 35 and the output of this cyclone 15 is fed to a wet-type scrubber 36. The cycloned and scrubbed air, which is a fraction of that passing through the conduit 13', is then released to the atmosphere.

Figure 4A:
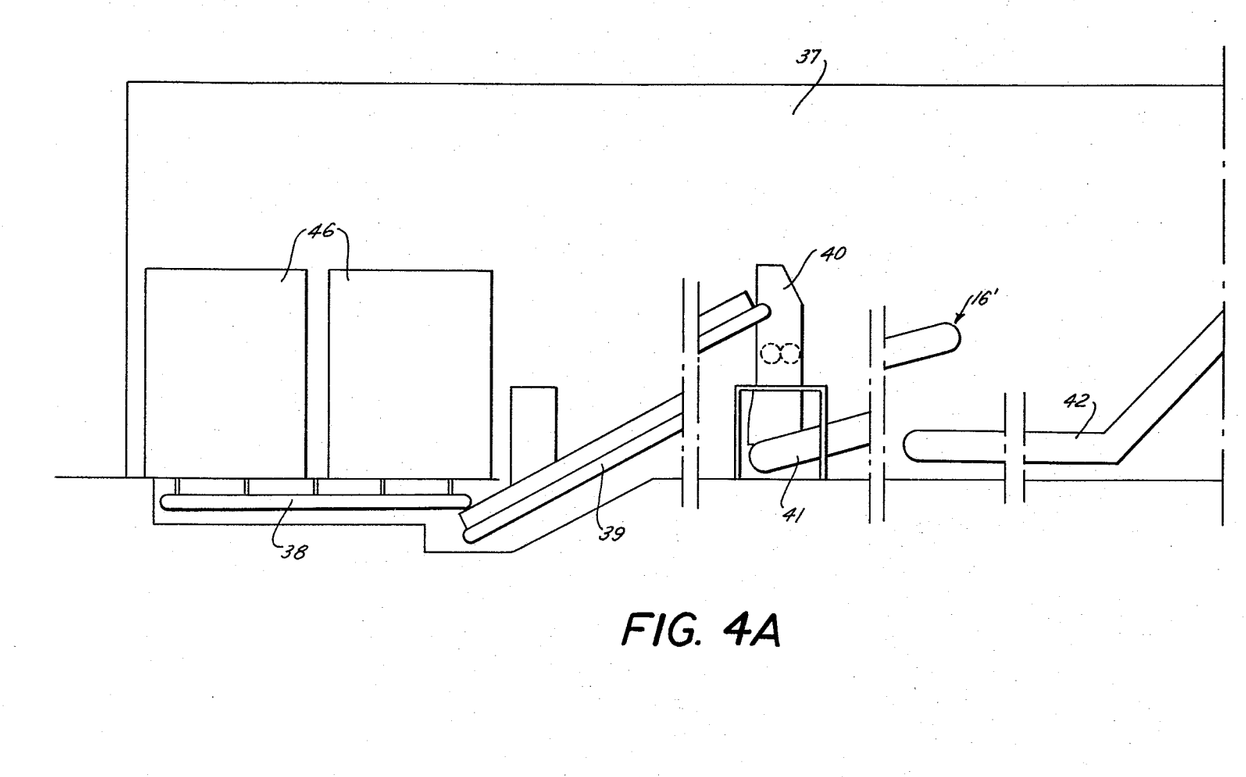
FIGS. 4A and 4B are side sectional views illustrating another system in accordance with this invention.
Figure 4B:
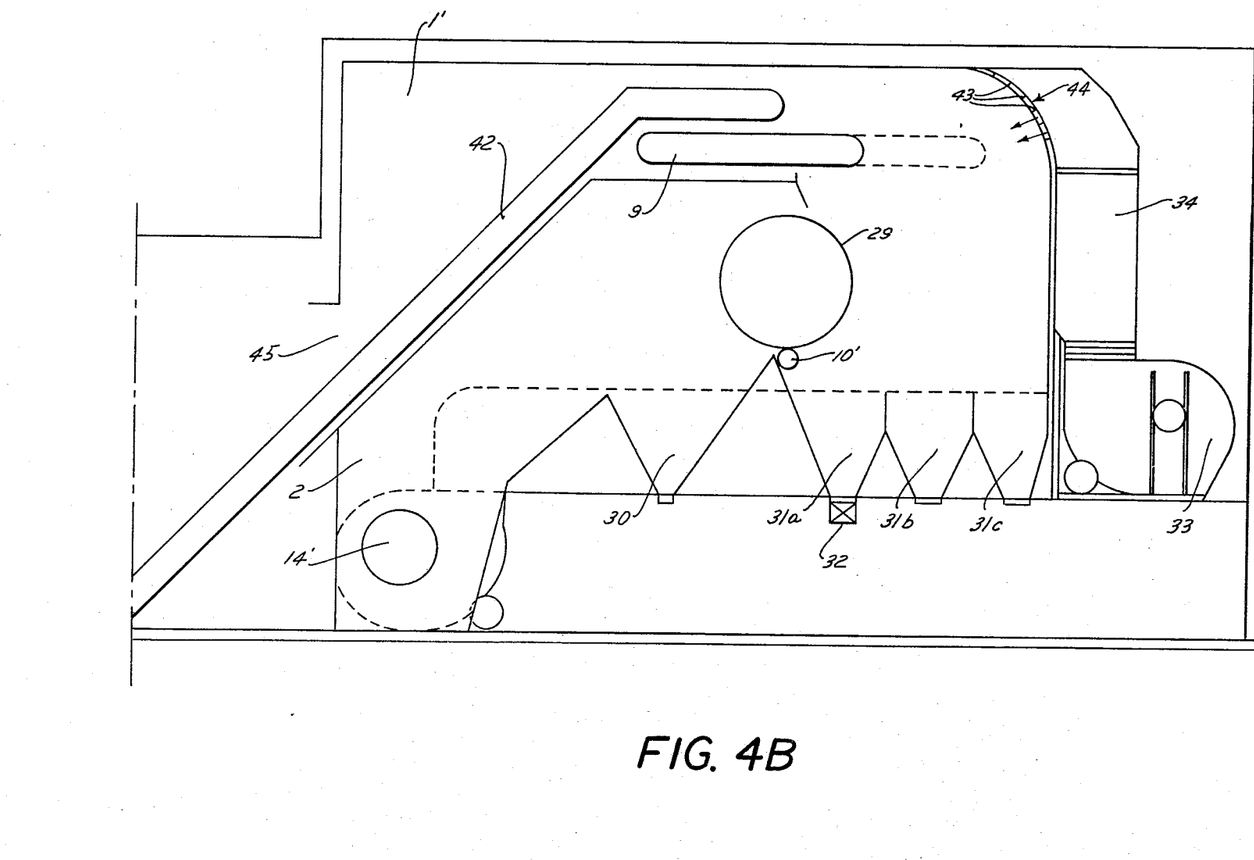
Figure 5:
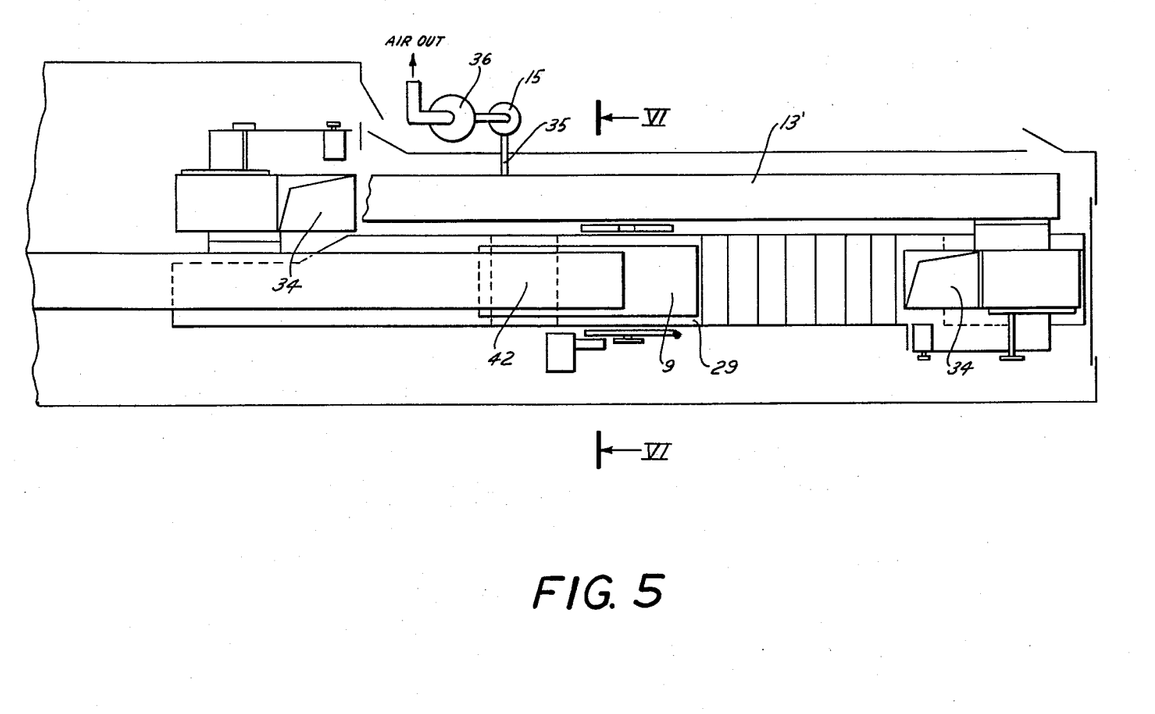
FIG. 5 is a top view of the portion of the system shown in FIG. 4B.
Figure 6:
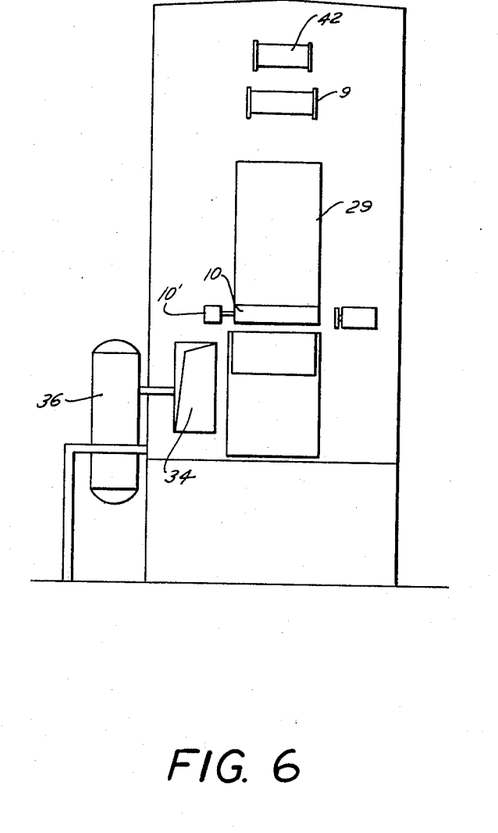
FIG. 6 is a section taken along line VI—VI of FIG. 5.

As shown in FIG. 4A trash carried in wagons 46 is dumped in its raw and completely untreated state onto belts 38 that load it onto a conveyor belt 39 that rises up in the preparation hall 37 and dumps it into the top of an apparatus 40. Large bags, cardboard boxes and the like are torn open in the apparatus 40 but the trash is not comminuted herein. Thereafter the trash is lead via another belt 41 over a magnetic separator 16' and dumped onto the lower end of the belt 42.

Since a minor portion of the air in conduit 13' escapes to the atmosphere through the cyclone 15 and scrubber 36 a slightly subatmospheric pressure is created inside the chamber 1'. Thus some air comes in through the hole 45, the amount bled off being calculated such that air enters at 45 at a speed almost identical to that of refuse rising in the belt 42. Since this entrance port 45 opens into the otherwise closed pretreatment hall 37 a migration of air in this hall toward the classification chamber 1' is obtained. Dust generated during the classification and bad-smelling air is therefore completely contained within the system. No complicated air locks or the like need be provided to admit the refuse into the chamber, nor need all of the classifying air be filtered on each circulation.

The method according to the present invention can be used on common household or light industrial refuse. It can recover from this refuse useful glass, metal and burnable paper items. It can also be used on various types of industrial refuse wherein the fractions can be separated and at least some of them reused.

It will be understood that each of the elements described above, or two or more together, may also find a useful application in other types of apparatus differing from the types described above.

While the invention has been illustrated and described as embodied in a refuse classifier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of treating refuse having light and heavy fractions, said method comprising the steps of:
    introducing a stream of said refuse in raw and uncomminuted condition at a predetermined velocity in a predetermined generally horizontal direction into a substantially closed chamber so that the refuse stream drops in said chamber along a path;
    circulating a current of air in a closed circuit and generally horizontally opposite said direction through said chamber;
    directing said current generally perpendicular to said path in said chamber;
    passing said current after passage through said path through a continuous sieve surface extending perpendicular to said current in said chamber, whereby a portion of said light fraction adheres to said surface;
    continuously displacing said surface across said circuit and stripping from said surface said portion adhering thereto;
    collecting the remainder of said light fraction in said chamber at a location relatively close to said sieve surface and said heavy fraction in said chamber at a location relatively far from said sieve surface;
    withdrawing a minor portion of the air in said closed circuit; and
    filtering said portion and releasing it to the atmosphere.

2. The method defined in claim 1 wherein said stream is introduced into said chamber through an entrance port, said method further comprising the step of replacing the withdrawn portion in said circuit by drawing air into said chamber substantially only through said entrance port, whereby slight subatmospheric pressure is created in said chamber.

3. The method defined in claim 2 wherein said air is drawn into said chamber through said port at a velocity generally equal to said predetermined velocity of said stream.

4. The method defined in claim 1, further comprising the step of removing particulate material from the air in said circuit downstream of said surface and upstream of said chamber.

5. The method defined in claim 1, further comprising the step of ripping open any bags and boxes full of refuse prior to introduction thereof into said chamber.

6. The method defined in claim 1, further comprising the step of magnetically removing from said refuse ferromagnetic items prior to introduction of said refuse into said chamber.

7. An apparatus for treating refuse consisting of light and heavy fractions, said apparatus comprising:
    a housing having an entrance port and defining a generally closed chamber;
    conveyor means for introducing a stream of raw and uncomminuted refuse into said housing through said port at a predetermined velocity in a predetermined generally horizontal direction so that said stream drops in said chamber along a path;
    a return conduit having an outlet end in said chamber at one side thereof and an inlet end in said chamber at the opposite side thereof, said inlet end being directed in said predetermined direction at said outlet end;
    blower means for circulating air in a closed circuit in said conduit and through said chamber in a generally horizontal flow direction generally perpendicular to said path and opposite said predetermined direction;

means for withdrawing portion of the air from said circuit outside said chamber, for filtering said portion of air, and for releasing said portion of air to the atmosphere;

a continuous sieve surface in said chamber extending perpendicularly to said flow direction and lying directly in front of said inlet end, whereby air is aspirated through said sieve surface and a portion of said light fraction adheres thereto;

means for continuously vertically displacing said surface;

means for stripping said portion from said surface at a location in said chamber vertically offset from said inlet end;

means relatively close to said sieve surface for collecting the remainder of said light fraction; and means relatively far from said sieve surfface for collecting said heavy fraction.

8. The apparatus defined in claim 7 wherein said sieve surface includes an endless foraminous band having a vertically extending front stretch lying directly in front of said inlet end.

9. The apparatus defined in claim 7 wherein said sieve surface includes a hollow foraminous drum and a motor for continuously rotating said drum.

10. The apparatus defined in claim 7 wherein said conveyor means includes a horizontally extending belt.

11. The apparatus defined in claim 7, further comprising:

a feed belt formed with an array of throughgoing holes and having an upstream end above said conveyor means;

means for displacing said feed belt in a direction to convey refuse carried thereon to said conveyor means; and means underneath a section of said feed belt for catching items falling through said holes.

12. The apparatus defined in claim 11 wherein said feed belt is provided with means for shaking said section and causing small items to fall through said holes.

13. The apparatus defined in claim 7, further comprising a feed belt delivering said refuse to said conveyor means, rotatable spiked rollers approaching said feed belt by a distance of between 200 mm and 500 mm, and means for rotating said rollers and thereby tearing open any bags and boxes on said feed belt extending thereabove by a dimension greater than said distance.

* * * * *